United States Patent [19]
Wang et al.

[11] Patent Number: 6,067,414
[45] Date of Patent: *May 23, 2000

[54] GENERATING A COMMON GATEWAY INTERFACE ADAPTOR CUSTOMIZED FOR A STORED PROCEDURE

[75] Inventors: I-Shin Andy Wang; Judianto Sidik; Shu-Huar Joseph Yeh; Rita S. Wu, all of San Jose, Calif.

[73] Assignee: International Business Machines Corporation, Armonk, N.Y.

[*] Notice: This patent is subject to a terminal disclaimer.

[21] Appl. No.: 09/222,005

[22] Filed: Dec. 30, 1998

Related U.S. Application Data

[63] Continuation of application No. 08/656,444, May 31, 1996, Pat. No. 5,875,332.

[51] Int. Cl.[7] .................................................... G06F 9/44
[52] U.S. Cl. ......................... 395/702; 395/701; 707/100; 707/101
[58] Field of Search ................................... 395/701, 702, 395/703, 705, 708, 200.33, 200.47, 200.48, 200.49, 200.5, 200.51, 200.52, 200.53, 200.54; 707/100, 101; 709/302, 304, 216–223

[56] References Cited

U.S. PATENT DOCUMENTS

| | | |
|---|---|---|
| 4,783,752 | 11/1988 | Kaplan et al. . |
| 4,821,220 | 4/1989 | Duisberg ................................ 364/578 |
| 5,675,805 | 10/1997 | Boldo et al. ............................. 395/706 |
| 5,875,332 | 2/1999 | Wang et al. ............................. 395/702 |

OTHER PUBLICATIONS

Cox, "Spider spins powerful web tool", Network World, Oct. 1995, pp. 14.

Gutierrez, "Nomad Development Corp's WebDBC common gateway interface—compliant program", Data Based Advisor, Aug. 1995 pp. 94(2).

"Purveyor WebServer for Windows NT, Programmer's Guide", Process Software Corporation, Aug. 1995.

*Primary Examiner*—Tariq R. Hafiz
*Assistant Examiner*—Kakali Chaki
*Attorney, Agent, or Firm*—Pretty, Schroeder & Poplawski, P.C.

[57] ABSTRACT

A method and apparatus for generating a Common Gateway Interface (CGI) adaptor customized for a stored procedure. In accordance with the present invention, stored procedure application developers can provides their stored procedure to a builder, which creates a CGI adaptor customized for the stored procedure. To generate the CGI adaptor, the builder parses the stored procedure to identify the arguments of the stored procedure. Then, using the stored procedure arguments, the builder generates logic to extract variables from an input data stream, wherein the variables correspond to the arguments of the stored procedure. The builder also generates logic to invoke the stored procedure using the variables extracted from the input data stream. The generated logic comprises the customized CGI adaptor.

18 Claims, 5 Drawing Sheets

GENERATING A COMMON GATEWAY INTERFACE ADAPTOR CUSTOMIZED FOR A STORED PROCEDURE

This application is a continuation of application Ser. No. 08/656,444, filed May 31, 1996, issued as U.S. Pat. No. 5,875,332 which application are incorporated herein by reference.

BACKGROUND OF THE INVENTION

1. Field of the Invention

This invention relates in general to common gateway interface programs, and in particular, to a method and apparatus for generating a customized common gateway interface adaptor for a stored procedure.

2. Description of Related Art

With the fast growing popularity of the Internet and the World Wide Web (also known as "WWW" or the "Web"), there is also a fast growing demand for Web access to databases. These databases may be accessed by Web clients by invoking stored procedures located on Web servers. One example is a stored procedure that dynamically builds a Structured Query Language (SQL) command based on the user inputs from the Web client. The user inputs and stored procedure outputs are passed between the Web client and the stored procedure through a Common Gateway Interface (CGI), a set of commonly-named variables and conventions for passing information on the Web.

Typically, this involves developing a CGI program to handle the input functions for the stored procedure. For example, the CGI program may receive a HyperText Markup Language (HTML) input data stream, extract the variables in the HTML stream which correspond to the arguments of the stored procedure, and call the stored procedure with the extracted variables. However, each stored procedure may require different input arguments. Thus, one of the problems with using CGI is the need to write a new CGI program for each stored procedure.

Thus, there is a need in the art for a method and apparatus for generating a CGI adaptor customized for a stored procedure.

SUMMARY OF THE INVENTION

To overcome the limitations in the prior art described above, and to overcome other limitations that will become apparent upon reading and understanding the present specification, the present invention discloses a method and apparatus for generating a CGI adaptor customized for a stored procedure. In accordance with the present invention, stored procedure application developers can provide their stored procedure to a builder, which creates a CGI adaptor customized for the stored procedure. To generate the CGI adaptor, the builder parses the stored procedure to identify the arguments of the stored procedure. Then, using the stored procedure arguments, the builder generates logic to extract variables from an input data stream, wherein the variables correspond to the arguments of the stored procedure. The builder also generates logic to invoke the stored procedure using the variables extracted from the input data stream. The generated logic comprises the customized CGI adaptor.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

The present invention comprises a method, apparatus, and article of manufacture for generating a customized CGI adaptor for a stored procedure in order to facilitate communication between clients and servers. The customized CGI adaptor method and apparatus enables a developer to build applications without writing a CGI adaptor program to handle the input interface for the stored procedure.

An application developer need only write an HTML input form and the stored procedure. The stored procedure is sent to a builder program which automatically generates a CGI adaptor customized for the stored procedure. The CGI adaptor handles the input interface between the user input and the stored procedure. Specifically, the CGI adaptor includes logic to extract variables from an input data stream, wherein the variables correspond to the arguments of the stored procedure, and invoke the stored procedure using the variables extracted from the input data stream.

HARDWARE ENVIRONMENT

Figure 1:
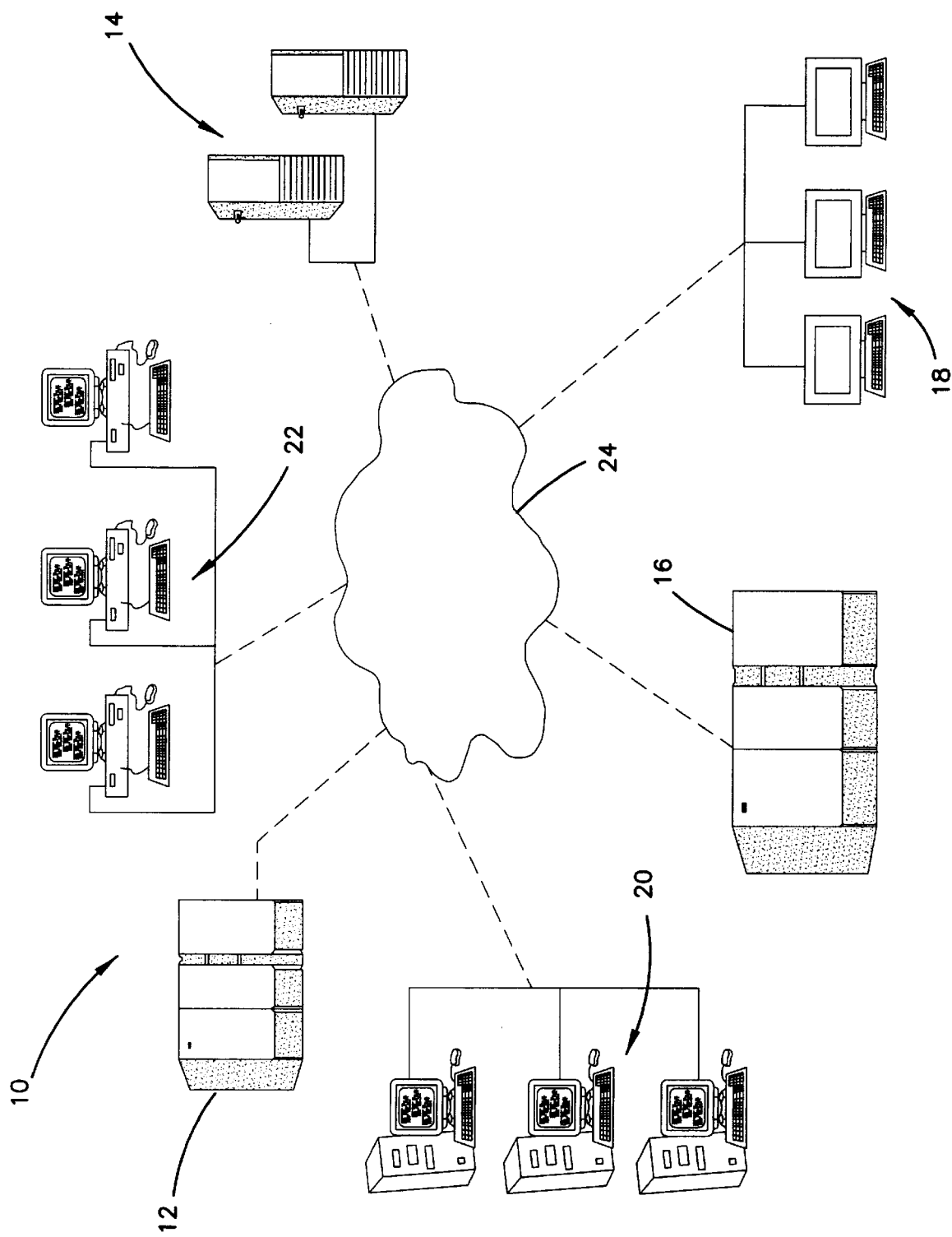
FIG. 1 pictorially illustrates the client-server environment of the preferred embodiment of the present invention.

FIG. 1 schematically illustrates the hardware environment of the preferred embodiment of the present invention, and more particularly, illustrates a typical distributed computer system using the Internet 10 to connect client systems 18, 22 executing Web browsers to server systems 20 executing Web daemons, and to connect the server systems 20 executing Web daemons to other server systems 12, 14, and 16, which may be database servers. A typical combination of resources may include clients 18, 22 that are personal computers or workstations, and servers 12, 14, and 20 that are personal computers, workstations, minicomputers, or mainframes. These systems are coupled to one another over a network 24, which may include other networks such as LANs, WANs, SNA networks, and the Internet.

Figure 2:
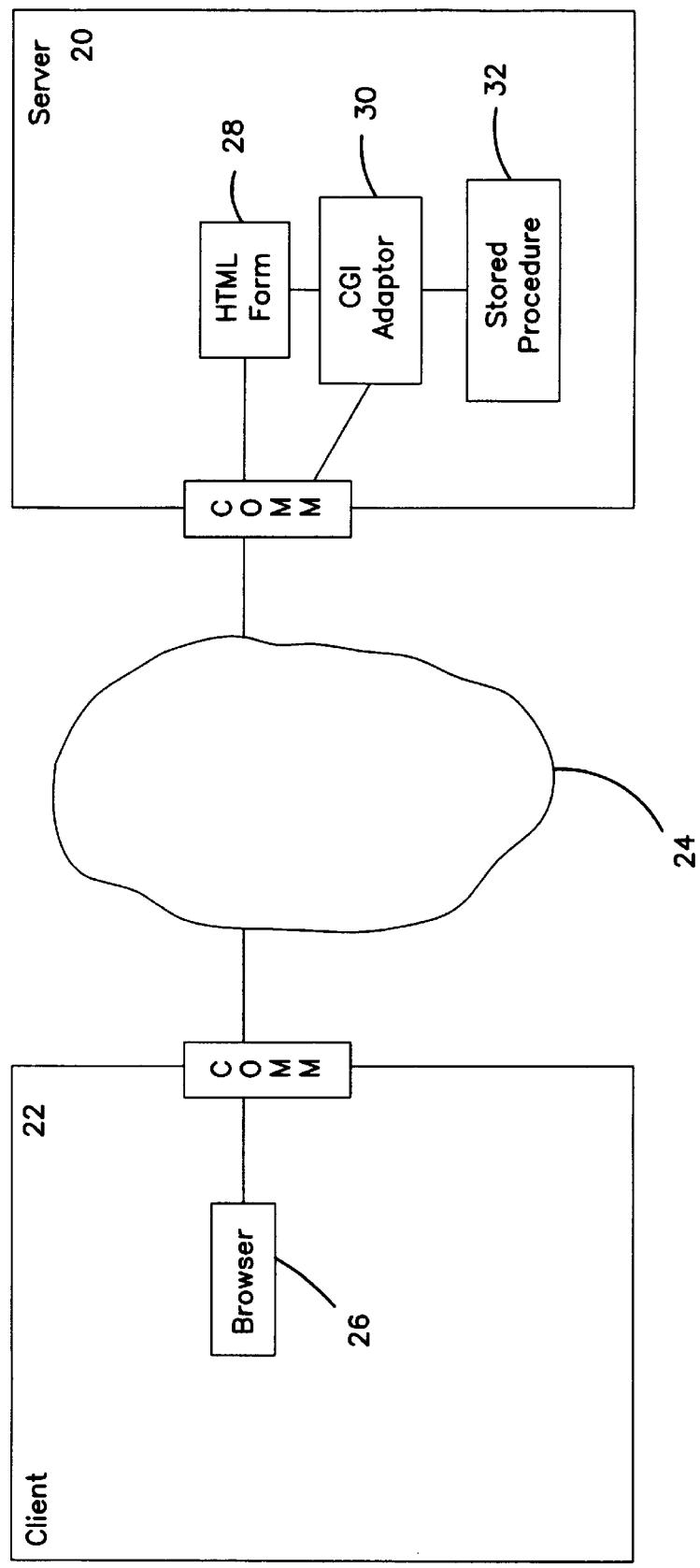
FIG. 2 illustrates further details of the interaction between a Web client and a Web server.

FIG. 2 illustrates further details of the interaction between a Web client 22 and a Web server 20. The Web client 22 typically executes a Web browser 26 such as IBM's Web Explorer, or NetScape or Mosaic. The Web server 20 typically executes a Web daemon such as IBM's HTTP Daemon or other WWW daemon. The client computer 22 is bi-directionally coupled with the server computer 20 over a line or via a wireless system.

The user interacts with the Web browser 26 and, at some point, executes an HTTP command via the Web browser 26 that results in communication with an HTTP daemon executing on the Web server 20. The HTTP command may be a call to an HTML input form 28. The Web server 20 transmits the HTML form 28 to the Web browser 26 where it is displayed to the user.

The user manipulates the HTML input form 28 via the Web browser 26, by selecting functions and/or entering data into input boxes. When the user invokes a "submit" or "post" command in conjunction with the HTML input form 28, the data from the HTML input form 28, along with the command, is transmitted to the Web server 20. The "submit" or "post" command typically is a hyperlinked item from the HTML input form 28 which comprises a universal resource locator (URL) that invokes the CGI adaptor 30. The CGI adaptor 30 can be invoked from an HTML form in one of two ways: either by an HTTP anchor reference or by an HTTP form action.

An HTTP anchor reference is typically formatted as follows: "<A HREF=http://{web-server}/{cgi adaptor-name}/[?variable_name=variable_value & . . . ]>". An HTTP form action is typically formatted as follows: "<FORM METHOD={method} ACTION=http://{web-server}/{cgi adaptor-name}>".

In both of the above examples, the following parameters are used:

"{web-server}" identifies the Web server;

"{cgi adaptor-name}" identifies the Common Gateway Interface (CGI) adaptor customized to a particular stored procedure;

"{method}" is either "GET" or "POST", as specified under the HTML standard;

"[?variable_name=variable_value & . . . ]" are query parameters that are passed to the CGI adaptor.

The CGI adaptor 30 receives the user input data from the HTML input form 28. Where {method}="GET", the input data is passed along with the URL and received in the QUERY_STRING variable, a request-specific CGI environment variable. The QUERY_STRING variable holds the input data in the form "[variable_name=variable_value & . . . ]". The CGI adaptor 30 extracts the variable_name and variable_value from the QUERY_STRING, associates each variable_value with the corresponding variable_name, and invokes the stored procedure for which it was created using the proper variables.

Where {method}="POST", the input data is received through the "standard in" (or stdin) file stream. The CGI adaptor 30 performs the same extracting, associating, and invoking steps as discussed above with respect to the "GET" method. However, prior to performing these steps, the CGI adaptor 30 must first read the stdin file stream into a string variable.

In this manner, the CGI adaptor 30 supports access to stored procedures 32 executable on the server 20. As indicated above, the stored procedure 32 may in turn access various database systems, such as a DB2, ORACLE, SYBASE, etc. to perform a query. The query results may then be forwarded to the Web browser 26 according to CGI conventions.

Figure 3:
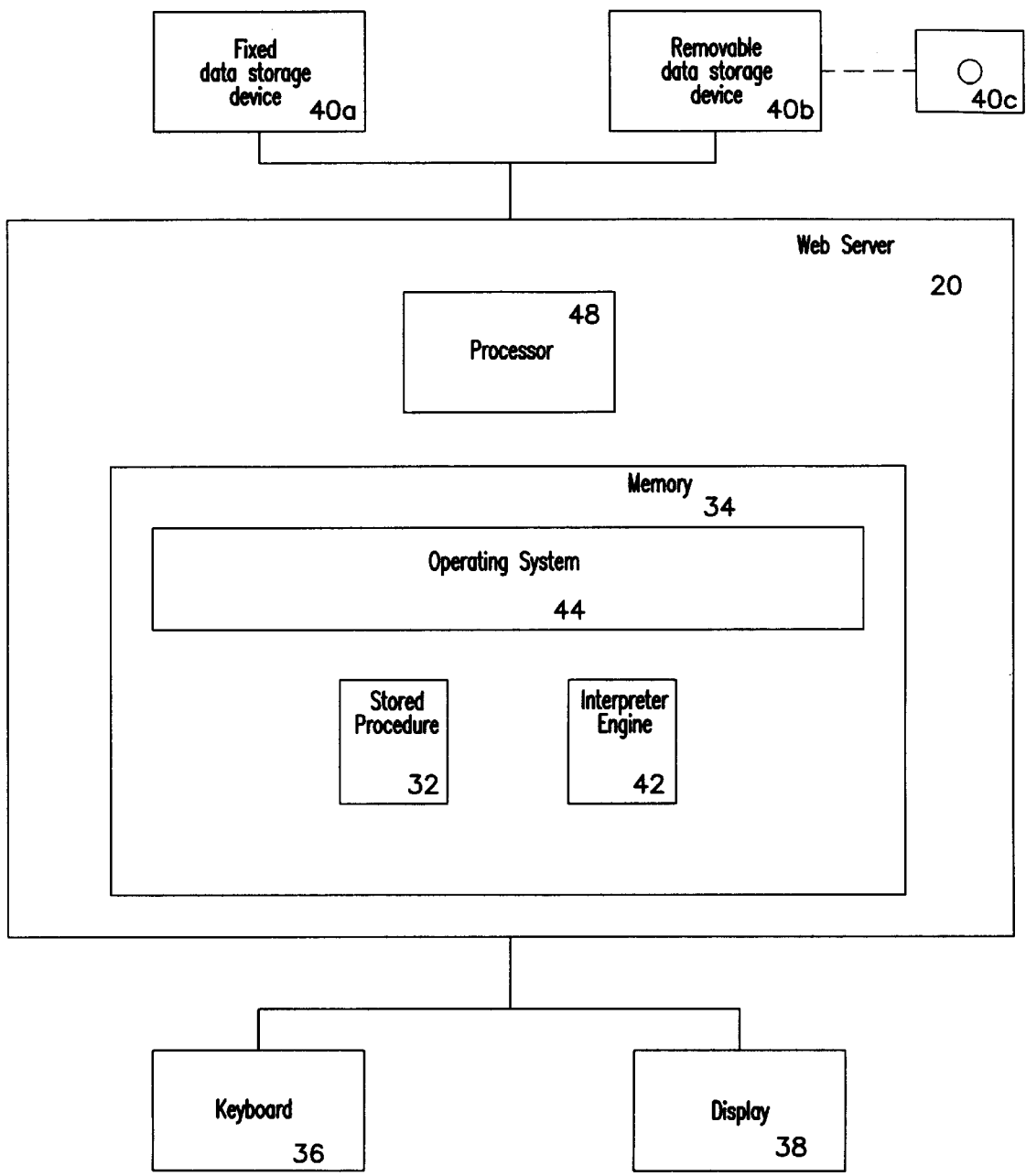
FIG. 3 illustrates further details of the exemplary hardware environment of the Web server used to implement the preferred embodiment of the invention.

FIG. 3 illustrates further details of the exemplary hardware environment used to implement the preferred embodiment of the invention, and, in particular, illustrates the hardware environment of the Web server 20. The Web server 20 may include, inter alia, a processor 48, memory 34, keyboard 36, display 38, as well as fixed and/or removable data storage devices and their associated media 40a, 40b, and 40c. Those skilled in the art will recognize that any combination of the above components, or any number of different components, peripherals, and other devices, may be used with the Web server 20.

The Web server 20 may further include an interpreter engine 42 executed under the control of an operating system 44, such as OS/2, Windows, AIX, UNIX, DOS, etc. In the preferred embodiment, the interpreter engine 42 conforms to VisualBasic language conventions, although those skilled in the art will recognize that the interpreter engine 42 could also conform to other language conventions without departing from the scope of the present invention.

The interpreter engine 42 executes the stored procedure 32. In general, the interpreter engine 42, operating system 44, and stored procedure 32 are all tangibly embodied in a computer-readable medium, e.g., one or more of the fixed and/or removable data storage devices and their associated media 40a–c. Moreover, the interpreter engine 42, operating system 44, and stored procedure 32 are all comprised of source language statements including instructions which, when read and executed by the Web server 20, causes the Web server 20 to perform the steps necessary to implement and/or use the present invention. Under control of the operating system 44, the interpreter engine 42 and stored procedure 32 may be loaded from the data storage device 40a–c into the memory 34 of the Web server 20 for use during actual operations.

Those skilled in the art will recognize many modifications may be made to this configuration without departing from the scope of the present invention.

GENERATION OF A CGI ADAPTOR

Figure 4:
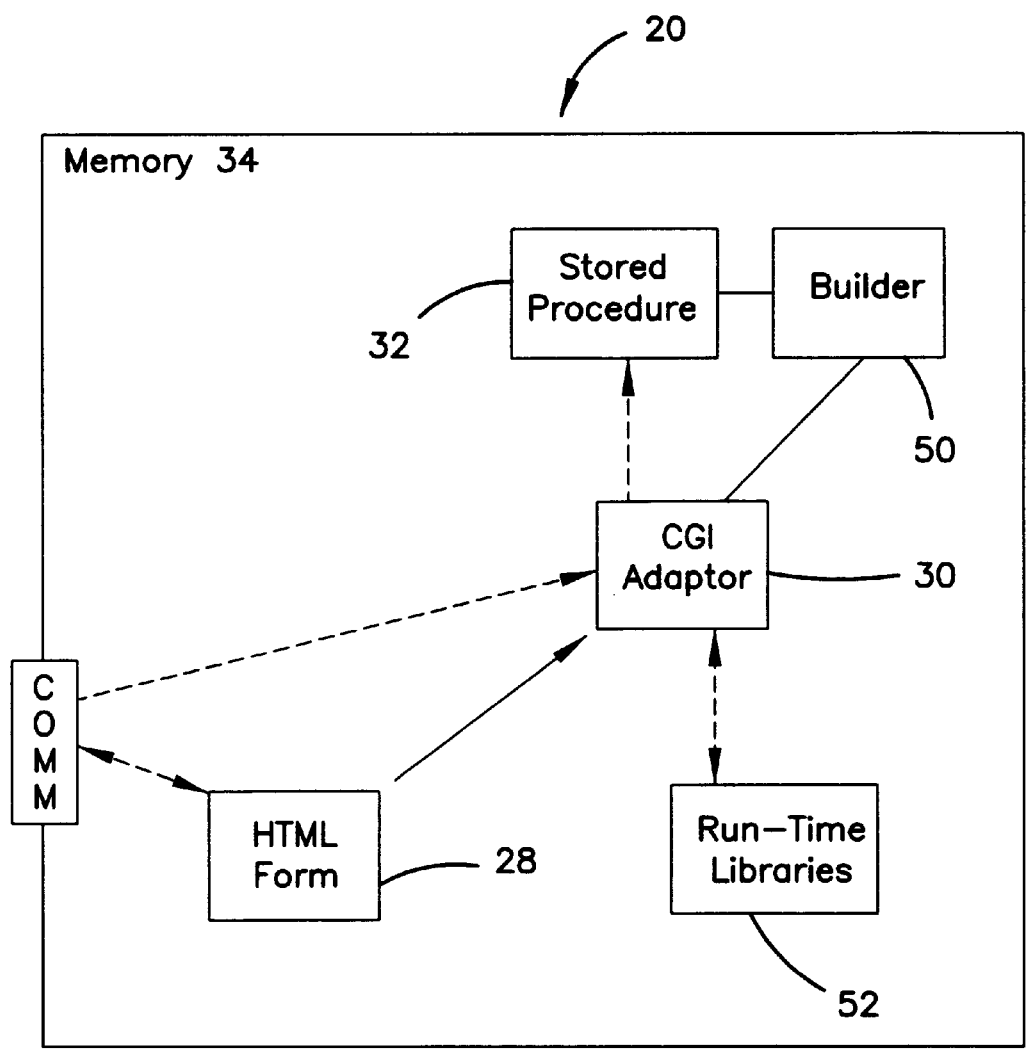
FIG. 4 illustrates the components on the Web server in one embodiment of the invention.

FIG. 4 illustrates the software components on Web server 20 in one embodiment of the invention. According to the invention, Web server 20 is provided with a builder program 50 and CGI run-time libraries 52. Generally, the builder program 50 and CGI run-time libraries 52 are both tangibly embodied in a computer-readable medium, e.g., one or more of the fixed and/or removable data storage devices and their associated media 20a–c, and loaded into memory 34 for execution.

The builder program 50 may be a VisualBasic program capable of being executed by interpreter engine 42. As will be discussed more fully below, the builder program 50 receives a stored procedure 32 and generates a CGI adaptor 30 customized for the stored procedure 32. As discussed above, the CGI adaptor 30 is capable of receiving input data from an HTML form 28, extracting therefrom the variables corresponding to arguments of the stored procedure 32, and invoking the stored procedure with the extracted variables. The CGI run-time libraries 52 handle universal functions and may be called by the CGI adaptor 32.

Figure 5:
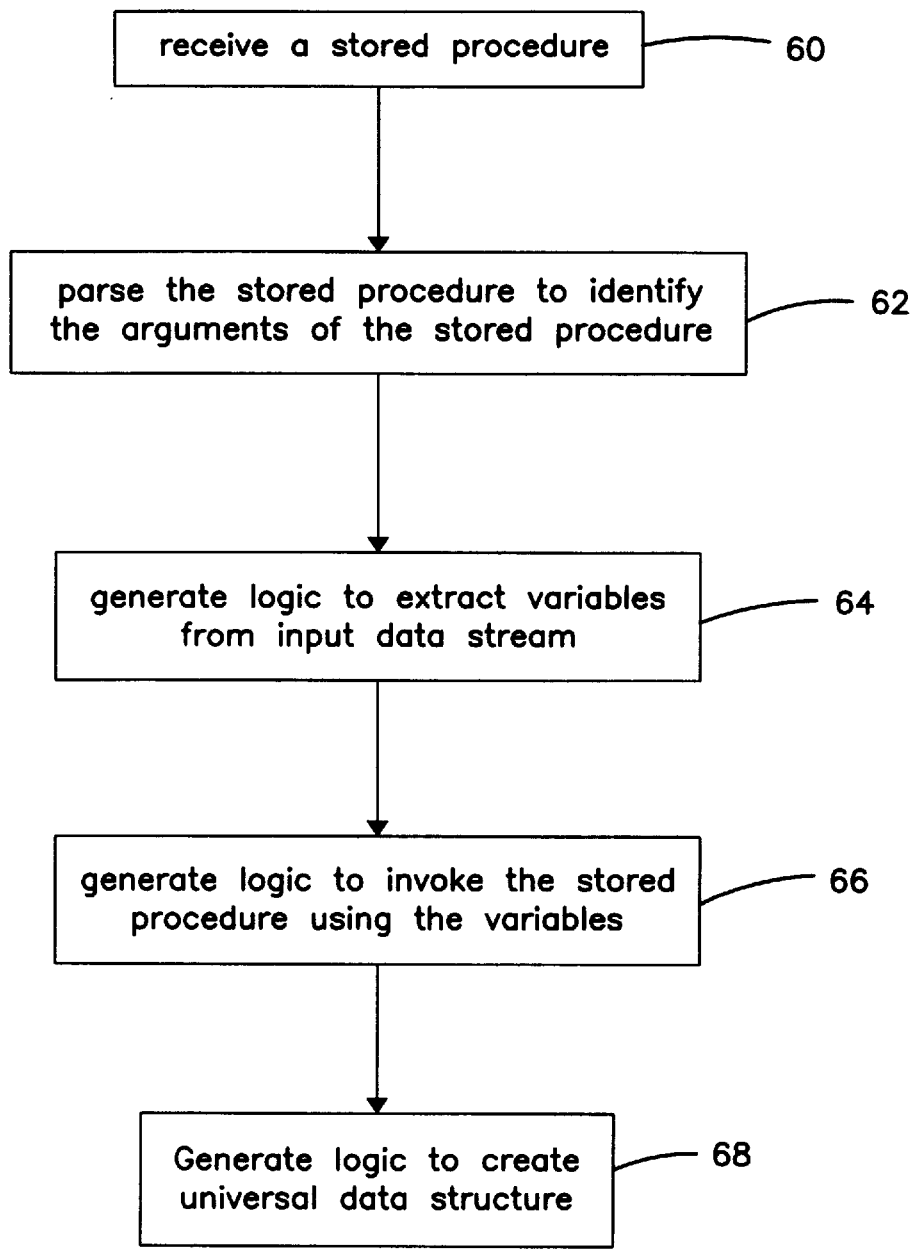
FIG. 5 is a flowchart illustrating the steps involved in generating a CGI adaptor customized for a stored procedure.

FIG. 5 is a flowchart illustrating the general flow performed during the generation of a customized CGI adaptor according to the present invention. Block 60 represents the builder program 50 receiving source language statements comprising a stored procedure program 32 into the memory 34 of the Web server 20. Block 62 represents the builder program 50 parsing the stored procedure 32 to identify its arguments. This step involves reading the first (or next) source language statement from the stored procedure program 32 and determining whether the language statement contains a stored procedure initialization statement that defines the name and types of the stored procedure's arguments. If the source language statement includes an initialization statement, then control passes to blocks 64 and 66.

At block 64, the builder program 50 generates logic to extract (hereinafter "extracting logic") variables from an input data stream, for example, HTML form data, wherein the variables correspond to the arguments of the stored procedure. The extracting logic may include logic to determine the type of method used to input the input data stream, for example, a "GET" method or "POST" method. Moreover, the logic may include logic to extract the variables from a QUERY_STRING environment variable of the input data stream and/or logic to extract the variables from stdin. The extracting logic may include logic to call various CGI run-time libraries 52. For example, the extracting logic may pass a variable identifying the input method to a run-time library 52 which extracts the variables from either the QUERY_STRING environment variable or stdin depending on the input method.

At block 66, the builder program 50 generates logic to invoke (hereinafter "invoking logic") the stored procedure 32 using the variables extracted from the input data stream. The invoking logic includes a call to the stored procedure 32, wherein the call passes the extracted variables.

The generation of the extracting and invoking logic at blocks 64 and 66 may include passing the name and type of each stored procedure 32 argument to a pre-written set of language statements, e.g., VisualBasic or C++ statements. The resulting program is specific to the stored procedure 30 and comprises a customized CGI adaptor program 32. If the CGI adapter program 30 is a VisualBasic program, it may be executed by the interpreter engine 42 when invoked. Where the CGI adaptor program 30 is a program requiring compiling, such as a C++ program, the CGI adaptor program 30 is provided to a compiler for compiling. The CGI adapter program 30 may then be executed directly by the operating system 44.

As indicated at block 68, the builder program 50 may further generate logic to extract information from the input data stream which does not correspond to the arguments and create a universal data structure from the information. This universal data structure may be provided to the stored procedure through one or more Application Programming Interfaces and used for obtaining more CGI environment information.

CONCLUSION

This concludes the description of the preferred embodiment of the invention. The following describes some alternative embodiments for accomplishing the present invention. For example, any type of computer, such as a mainframe, minicomputer, or personal computer, could be used to implement the present invention. In addition, the present invention is not limited by a specific programming language. The builder program stored procedure, and/or the generated CGI adaptor program may comprise other programming languages, for example, C, C++, Perl, Cobol, etc. Accordingly, the present invention may be implemented through the use of a compiler in place of or in conjunction with the interpreter engine 42. Moreover, input data streams other than HTML form data are within the scope of the invention.

In summary, the present invention discloses a method and apparatus for generating a CGI adaptor program customized for a stored procedure. In accordance with the present invention, application developers can provides their stored procedure to a builder program, which creates a CGI adaptor program customized for the stored procedure. To generate the CGI adaptor program, the builder program parses the stored procedure to identify the arguments of the stored procedure. Then, using the stored procedure arguments, the builder program generates logic to extract variables from an input data stream, wherein the variables correspond to the arguments of the stored procedure. The builder program also generates logic to invoke the stored procedure using the variables extracted from the input data stream. The generated logic comprises the customized CGI adaptor program.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of generating a Common Gateway Interface (CGI) adaptor customized for a stored procedure to facilitate communication between a client and a server, comprising the steps of:

parsing the stored procedure to identify one or more arguments of the stored procedure, wherein the stored procedure is stored at the server;

generating procedure-specific logic to extract variables from an input form received from the client, wherein the variables correspond to the arguments of the stored procedure; and generating procedure-specific logic to invoke the stored procedure at the server using the variables extracted from the input data stream from the client.

2. The method of claim 1, further comprising the step of generating logic to extract information from the input data stream that does not correspond to the arguments and to create a universal data structure from the information.

3. The method of claim 1, wherein the logic generating step comprises the step of generating a call to a CGI run-time library.

4. The method of claim 1, wherein the generating step comprises the step of generating logic to extract the variables from a command line.

5. The method of claim 1, wherein the generating step comprises the step of generating logic to call the stored procedure.

6. The method of claim 1, wherein the stored procedure comprises source language statements, and wherein the parsing step comprises the step of reading the source language statements of the stored procedure.

7. A Common Gateway Interface (CGI) adaptor generating apparatus for facilitating communication between a client and a server, comprising:

a computer; and one or more computer programs, performed by the computer, for parsing the stored procedure to identify one or more arguments of the stored procedure, wherein the stored procedure is stored at the server for generating procedure-specific logic to extract variables from an input form received from the client, wherein the variables correspond to the arguments of the stored procedure, and for generating procedure-specific logic to invoke the stored procedure at the server using the variables extracted from the input data stream from the client.

8. The apparatus of claim 7, further comprising one or more computer programs, performed by the computer, for generating logic to extract information from the input data stream that does not correspond to the arguments and to create a universal data structure from the information.

9. The apparatus of claim 7, wherein the apparatus further comprises one or more computer programs, performed by the computer, for generating a call to a CGI run-time library.

10. The apparatus of claim 7, wherein the apparatus further comprises one or more computer programs, performed by the computer, for generating logic to extract the variables from a command line.

11. The apparatus of claim 7, wherein the apparatus further comprises one or more computer programs, performed by the computer, for generating logic to call the stored procedure.

12. The apparatus of claim 7, wherein the stored procedure comprises source language statements, and wherein the parsing means comprises means for reading the source language statements of the stored procedure.

13. An article of manufacture for use in generating a Common Gateway Interface (CGI) adaptor to facilitate communication between a client and a server, the article of manufacture comprising a computer-readable storage medium having a computer program embodied therein that causes the computer to perform the steps of:

parsing the stored procedure to identify one or more arguments of the stored procedure, wherein the stored procedure is stored at the server;

generating procedure-specific logic to extract variables from an input form received from the client, wherein the variables correspond to the arguments of the stored procedure; and generating procedure-specific logic to invoke the stored procedure at the server using the variables extracted from the input data stream from the client.

14. The article of manufacture of claim 13, further comprising the step of generating logic to extract information from the input data stream that does not correspond to the arguments and to create a universal data structure from the information.

15. The article of manufacture of claim 13, wherein the generating step comprises the step of generating a call to a CGI run-time library.

16. The article of manufacture of claim 13, wherein the generating step comprises the step of generating logic to extract the variables from a command line.

17. The article of manufacture of claim 13, wherein the generating step comprises the step of generating logic to call the stored procedure.

18. The article of manufacture of claim 13, wherein the stored procedure comprises source language, statements, and wherein the parsing step comprises the step of reading the source language statements of the stored procedure.

* * * * *